United States Patent [19]

Rosenberg et al.

[11] Patent Number: 4,967,458
[45] Date of Patent: Nov. 6, 1990

[54] PROCESS FOR RENEWING CYLINDER HEADS

[75] Inventors: Eugene Rosenberg, Haworth, N.J.; Jay Sanders, New York, N.Y.; Raymond English, Closter, N.J.

[73] Assignee: Automotive Aftermarket Development Corporation, Jersey City, N.J.

[21] Appl. No.: 141,623

[22] Filed: Dec. 31, 1987

[51] Int. Cl.$^5$ .................... B23P 15/00; B23P 6/00; B23K 31/00
[52] U.S. Cl. .................... 29/888.011; 29/402.07; 29/526.4; 228/119
[58] Field of Search ............... 29/156.4 WL, 402.07, 29/503; 228/103, 119

[56] References Cited

U.S. PATENT DOCUMENTS

| | | | |
|---|---|---|---|
| 2,632,944 | 3/1953 | Kittelson | 228/119 |
| 3,192,618 | 7/1965 | Altgelt | 227/119 |
| 3,392,435 | 7/1968 | Swick et al. | 228/103 |
| 3,675,309 | 7/1972 | Borkoski | 29/401 |
| 4,364,159 | 12/1982 | Holcombe | 29/156.5 R |

OTHER PUBLICATIONS

Saving Aluminum Heads, by Larry Carley, Automotive Rebuilder, Sep. 1986, pp. 30–34, 37–39.
Flat Out, by John Decker, Motor, Apr. 1986, pp. 55, 59–62.
Straight Heads–Magic Is Not Needed, by Gary Lewis & Dimitri Elgin, Automotive Rebuilder, Nov. 1985, pp. 24–26, 28, 30–31.
Welding Techniques, Part Two, by Jerry Heasley, Motor, Oct. 1984, pp. 42, 44–46.
How To Do The Impossible, by Vern Heinrich & Mike Pankratz, Renews, Mar. 1987, pp. 18–19, 40–42.
Escort Heads–Making Repairs, by Jim Hughes, Automotive Rebuilder, Dec. 1987, pp. 26–28, 30–32, 34–35.

Primary Examiner—Bruce Y. Arnold
Assistant Examiner—Ronald M. Kachmarik
Attorney, Agent, or Firm—Larson and Taylor

[57] ABSTRACT

A process for renewing a cylinder head, preferably a cast aluminum water cooled cylinder head from a used condition to a rebuilt condition suitable for reuse. In a qualifying stage the used cylinder head is stripped of removable parts, inspected, heat treated for cleaning and stress relieving purposes, and then pressure tested to detect leaks through cracks or excessive porosity. If cracks are located, the cylinder head passes through a reconstruction stage wherein cracked areas are removed and replaced by welded material, recontoured and preferably again pressure tested. A cylinder head which did not need reconstruction (or after reconstruction) then passes to the rebuilding stage where it is essentially machined and component parts replaced. Included in the rebuilding stage is a line-boring and surface gasket facing procedure for eliminating the adverse effects of warpage and a vacuum impregnation step to seal the pores of the cylinder head.

10 Claims, 3 Drawing Sheets

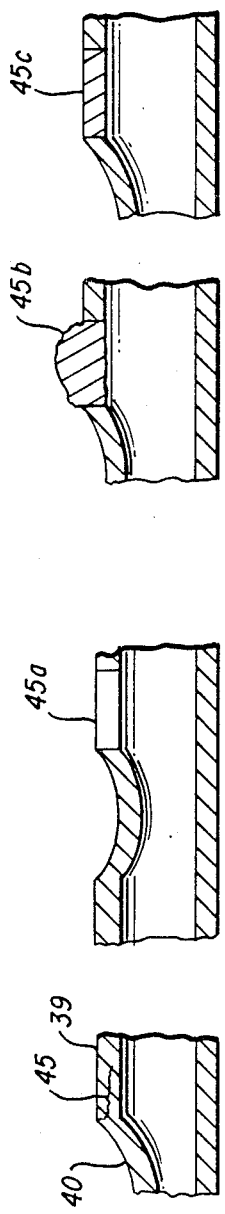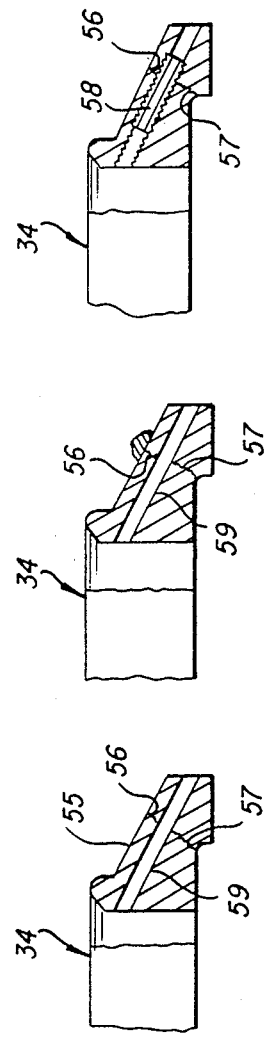

PROCESS FOR RENEWING CYLINDER HEADS

FIELD OF THE INVENTION

This invention relates to the processing of used cylinder heads, and it relates in particular to a new and improved method for renewing a used water cooled aluminum cylinder head to a reusable condition.

BACKGROUND OF THE INVENTION

In the manufacture of an automobile, one of the more expensive components is of course the automobile engine, and a relatively expensive component of the automobile engine is the cast cylinder head. Hence, an industry has existed for many years to rebuild major components of an automobile engine so that an automobile owner in need of a new engine or a new cylinder head can save substantial amount of money by purchasing a rebuilt engine or rebuilt cylinder head rather than new factory parts.

In recent years, aluminum cast engine parts, especially aluminum cast water cooled cylinder heads have become more popular, primarily because of their light weight characteristic. For example, aluminum cylinder heads are now used on the best selling car in the world, the Ford Escort. However, aluminum also has certain disadvantages. For example it lacks the hardness of iron and hence it is more expensive to machine. Aluminum expands and contracts at approximately twice the rate of cast iron in response to temperature changes, thus creating the possibility for thermal induced stress, especially since this aluminum head is generally mounted on a cast iron block which expands and contracts at half the rate of aluminum. Increased thermal expansion and contraction in turn increases the possibility of stress related cracks. The most probable areas for cracks include the areas around the valve seats or between the intake and exhaust seats or just under the exhaust seats. The industry of renewing cylinder heads has existed for decades, and because of the tremendous importance of aluminum cylinder heads, as discussed above, the industry has already been developed to renew them, i.e., rebuild them in an attempt to arrive at a completely renewed cylinder head of sufficient quality to be assembled onto an engine block for use in an automobile.

However, until now the various attempts at renewing aluminum water cooled cylinder heads have been relatively unsuccessful. The yield of rebuilt cylinder heads which actually performed successfully in subsequent use is thought to be as low as 50%. Considering the large and growing importance of aluminum cylinder heads, a critical need now exists for updating current technology to increase the quality and hence the yield of renewed aluminum cylinder heads.

The state of the art prior to the filing of the present application is best described in a number of trade journal magazine articles including the following:

"Saving Aluminum Heads" by Larry Carley, *Automotive Rebuilder*, September 1986;

"Flat Out" by John Decker, *Motor*, April 1987;

"Straight Heads—Magic Is Not Needed" by Gary Lewis and Dimetri Elgin, *Automotive Rebuilder*, November 1985;

"Welding Techniques, Part II" by Jerry Heasley, *Motor*, October 1984;

"Welding Aluminum Cylinder Heads, How To Do The Impossible" by Vern Heinrich and Mike Pankartz, *Renews*, March 1987; and "Escort Heads—Making Repairs" by Jim Hughes, *Automotive Rebuilder*, December 1987.

In addition, rebuilding of an aluminum cylinder head is described in U.S. Pat. No. 3,192,618, issued July 5, 1965, although this patent relates to the rebuilding of an air cooled aircraft cylinder head, the renewal process for which would be substantially different than for a water cooled automotive type aluminum cylinder head.

Thus, a need exists for new and improved processes for renewing aluminum cylinder heads, especially water cooled aluminum cylinder heads of the automotive type, which processes will overcome the major disadvantage of prior techniques by providing a substantially higher yield of acceptable, operable cylinder heads and, correspondingly a substantially lower percentage of failures.

SUMMARY OF THE INVENTION

It is a purpose of the present invention, to satisfy the existing need by providing a process which provides a superior quality product, and results in a substantially higher yield. This purpose is achieved by implementing new discoveries which recognize shortcomings and hence the reasons for the large number of failures in the known techniques. Depending on the condition of the cylinder head being renewed, some, but not necessarily all of these new discoveries need be employed on any given cylinder head.

The overall cylinder head renewal process can be subdivided into three general stages. In the first stage, the qualifying stage, an unqualified cylinder head, i.e., a used cylinder head just after removal from a vehicle, is stripped of parts, inspected, cleaned and then tested for cracks in order to "qualify" this cylinder head as either rebuildable in its present form or in need of reconstruction work prior to rebuilding. In the latter case, the cylinder head moves into a second stage, referred to as the reconstruction stage, wherein cracks, breakage and the like are repaired. A cylinder head which was tested as rebuildable after the first stage or a cylinder head which has completed the reconstruction stage then passes to the third stage which is the rebuilding stage. This is the stage during which the head is machined and elements associated with the basic aluminum casting, i.e., the valve guides, valve seats, rocker arms, etc., are remounted onto the cylinder head. While the original valve guides and valve seats and possibly other parts might be usable, in general many of the other associated elements used in the rebuilding of a cylinder head are new elements.

Although the invention involves a number of different discoveries which are utilized to alter different steps in the overall renewal process, there are several principles which are important throughout the renewal process. One major principle is the avoidance of contamination, especially in connection with the welding and impregnating steps. The elimination of contamination is one reason for the advantageous results of the present invention and this in turn dictates certain procedures at different points in the overall process in place of previously known techniques which caused contamination.

Another important feature of the present invention is its special recognition of the porosity problem. It has been known that aluminum castings are relatively porous. Such porosity is effectively dealt with by the original manufacturer of the cylinder head. However, the benefits of the chemicals used by the original manufacturer to eliminate the adverse effects of porosity have generally been fully neutralized by the time the cylinder head reaches the beginning if not the end of the renewal process.

Prior techniques for restoring the chemicals which combat porosity have not been successful. Thus, another advantage of the present invention is that it successfully deals with and eliminates the adverse effects of porosity in a rebuilt aluminum water cooled cylinder head. More specifically, the present invention employs a vacuum impregnation procedure for impregnating the cylinder head with a resin material to subsequently prevent the adverse effects of porosity.

Other important principles used in the process of the present invention include the correct usage of stress relieving techniques and an improved method for overcoming the adverse effects of warpage of the cylinder head.

Thus, it is an object of the present invention to provide a new and improved process for renewing cylinder heads.

It is another object of the present invention to provide a new and improved process for more efficiently and with a higher yield of successful results, renewing a water cooled aluminum cylinder head.

It is still another object of the present invention to povide a new and improved cylinder head renewal process wherein contamination is substantially reduced or eliminated.

It is still another object of the present invention to provide a renewal process for an aluminum cylinder head wherein resin is impregnated to eliminate the adverse effects of porosity.

It is still another object of the present invention to provide a new and improved aluminum cylinder head renewal procedure wherein warpage of the cylinder head is neutralized by special machining of the camshaft cavity and the gasket face.

It is still another object of the present invention to provide a new and improved aluminum cylinder head renewal process which utilizes an improved testing procedure, pressurized air at a higher pressure, in order to facilitate locating any broken or cracked areas or excess porosity.

These and other objects of the present invention will become apparent from the detailed description to follow, to be taken together with the accompanied drawings.

BRIEF DESCRIPTION OF THE DRAWINGS

There follows a detailed description of preferred embodiments of the present invention, to be read together with the accompanying drawings wherein:

FIGS. 4A through 4D show a portion of FIG. 3 taken along line 4—4 of FIG. 3 at four different stages in the reconstruction process.

FIGS. 5A to 5C shows an oil galley portion of a cylinder head, at different stages of repair.

DETAILED DESCRIPTION OF THE PREFERRED EMBODIMENTS

Figure 1:
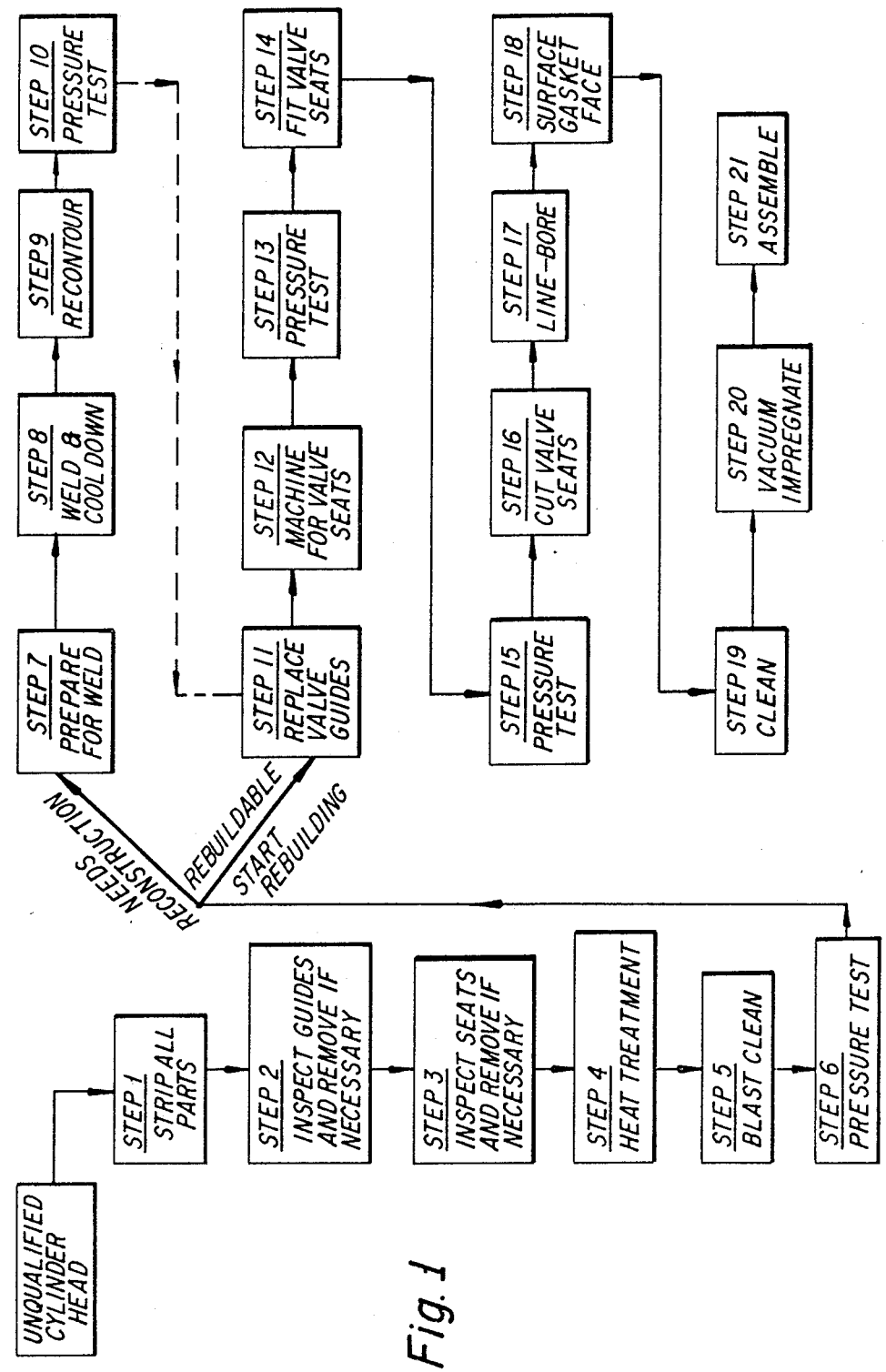
FIG. 1 is a flow diagram showing the respective steps in carrying out the method of the present invention.

Referring now to the drawings, like elements are identified by like numerals throughout the several views.

This invention relates to the renewal of a used water cooled aluminum cylinder head from its used state to a rebuilt condition suitable for reuse. The term "renewal" is intended to encompass some or all of the steps from the initial stage where the cylinder head is removed from the engine of its original use, for example from the cylinder block of an automobile, through qualification, reconstruction, rebuilding of the cylinder head. Each of these respective terms will be explained in greater detail below.

Although the improvements of the present invention are adaptable for use with any aluminum cylinder head, they are particularly adaptable for use with a water cooled aluminum cylinder head. More specifically, the invention has its greatest application to an automotive water cooled aluminum cylinder head. Within that context, the present invention will be described in detail with particular reference to the aluminum cylinder head of a Ford Escort vehicle since this is an important use, the Ford Escort being the best selling car in the world, as well as the most difficult to renew.

FIG. 1 is a schematic flow diagram illustrating all steps of the process, starting from the time that an "unqualified" cylinder head has just been removed from an automotive cylinder block. The diagram illustrates all of the steps which may possibly be necessary up to the point where the cylinder head is absolutely completed and ready for shipment to a customer for reinstallation onto a vehicle cylinder block. It will be understood from the description to follow as well as the appended claims that not all of these steps will necessarily have to be followed in the renewal of each and every cylinder head. Nor is it always necessary to follow the precise sequence as the steps are discused below.

Since the features of the present invention are applicable to any water cooled aluminum cylinder head, there will be illustrated herein only a schematic representation of such a cylinder head. Additionally, the details of an actual cylinder head are both well known and too detailed for practical illustration herein. For complete details of a particular cylinder head reference may be had to owner's and service manuals published by the manufacturer of the cylinder head. Additionally, many details are illustrated in the article referred to earlier in this application entitled "Escort Heads-Making Repairs" by Jim Hughes, published in Automotive Rebuilder, December 1987.

Figure 2:
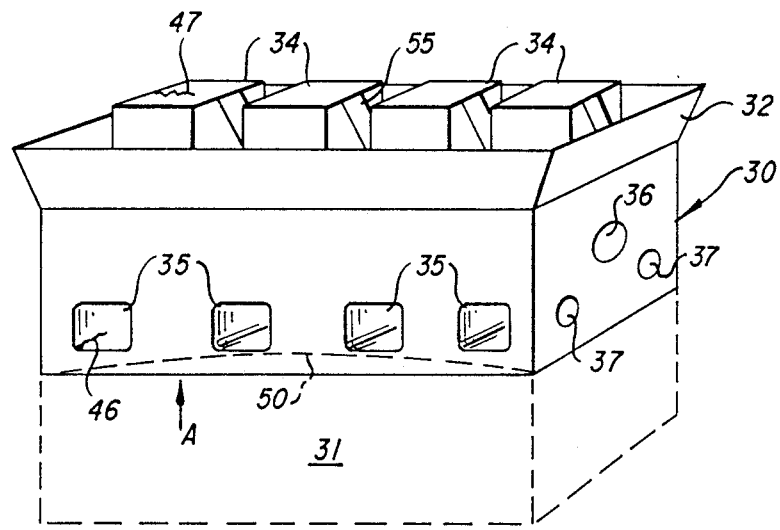
FIG. 2 is a highly schematic illustration of a specific type of water cooled aluminum cylinder head.

Referring now to highly schematic FIG. 2, the aluminum cylinder head 30 is the entire portion which sits on top of the engine block 31 which is shown in dotted lines in FIG. 2. The top of the head 30 is circumscribed by a raised wall 32 which in practice supports a cover member which would cover over the top of the cylinder head 30. The cylinder head 30 is for a four cylinder engine. Each cylinder has associated therewith a superstructure, represented schematically by the numeral 34, which in a well-known manner includes the elements associated with the top of each cylinder including the valve openings, oil gallerys 55, rocker arms and associated elements, springs and the like. On one side (the side not shown in FIG. 2) the cylinder head 30 is provided with air-fuel mixture inlet ports. On the opposite side, i.e., the side shown in FIG. 2, the cylinder head 30 is provided with exhaust ports 35. In practice, these exhaust ports would feed into an exhaust manifold (not shown).

The movable elements of the superstructure 34 are operated by a camshaft which is received in camshaft opening 36 and driven in use through a take-off mechanism from the main power train of the engine. In a water cooled cylinder head, the water flow passages are made up of a labyrinth of paths crisscrossing through the interior of the cast cylinder head. There is shown in FIG. 2 the outlet openings 37 for the cooling water and in FIG. 3 the inlet openings 38.

Figure 3:
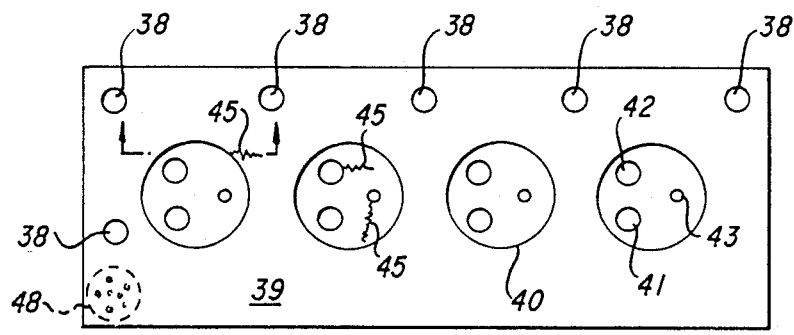
FIG. 3 is a bottom view of FIG. 2.

FIG. 3 shows the underside, i.e., the gasket face 39 of the cylinder head, viewing the cylinder head in the direction of arrow A of FIG. 2. This of course is the flat surface which mates with the upper surface of the cylinder block 31. Viewing the cylinder head in this direction, one sees the recessed domes 40 of the respective combustion chambers, including within each dome the bottoms of the inlet port 41, the exhaust port 42 and the spark plug port 43.

As explained in greater detail below, a major segment of the overall renewal process includes eliminating all possible cracks, excess porosity or the like which detract from the pressure tight and operative structural integrity of the basic aluminum casting, i.e., apart from the integrity of the various elements added thereto, the valves, valve guides, valve seats, rocker arms, camshaft, etc. These cracks can occur in virtually any location and the features of the present invention are capable of restoring such structural integrity at almost any location. The most likely place for a crack to occur is within the domes 40. There is illustrated, for example in FIG. 3 a series of cracks 45 in the vicinity of the domes 40. Another likely location for cracks is in the vicinity of the inlet or exhaust ports, such as cracks 46 in exhaust port 35 of FIG. 2. Additionally, the elements of the superstructure which are part of the aluminum casting, such as the oil gallery or the rocker arm bosses can include cracks, one such crack being represented schematically at 47 in FIG. 2 and another shown at 56 and 57 in FIG. 5 in an oil gallery. In addition, the aluminum material itself is so porous that leakage in the form of oozing can occur directly through an excessively porous portion of the cylinder head wall itself, as shown for example in the vicinity of dotted line area 48 in FIG. 3.

The overall cylinder head renewal process will now be explained, step-by-step, from start to finish, including mandatory and optional steps, especially with reference to the preferred embodiment of the present invention, renewal of an aluminum water cooled cylinder head as shown and described schematically with respect to FIGS. 2 and 3 and especially with respect to the cylinder head of a Ford Escort automobile.

In the description of the process, reference will be made to FIG. 1 and the steps will be identified by the numerical designations of the steps in FIG. 1.

Referring to the schematic diagram of FIG. 1, the overall process, referred to herein as "renewal" starts with an "unqualified" cylinder head which is a used cylinder head which has just been removed from the cylinder block of an automobile engine. The initial stage, which encompasses steps 1 through 6 of FIG. 1 simply brings the cylinder head to a point where it can be qualified as either in need of reconstruction, meaning that it has cracks, breakage or the like, such that it cannot proceed to be rebuilt without reconstruction work to repair the cracks, breakage and the like. Alternatively, after the qualifying stage, if the cylinder head is not in need of reconstruction, i.e., does not have cracks, breakage or the like, it is qualified as rebuildable and can proceed directly to the rebuilding stage, steps 11 through 21 of FIG. 1. If the head was originally classified as needing reconstruction, once that reconstruction has been completed, the head then proceeds to the rebuilding stages, steps 11 through 21. At the end of the process, after step 21, the head is assembled, meaning that it has not only been repaired but that all of the component parts which were present on the cylinder head when it was received prior to step 1, but which were removed in carrying out steps 1 through 20 have now been replaced with new or qualified rebuilt parts. This unit is ready for installation onto an automobile.

At step 1 the unqualified cylinder head is stripped of all moving parts. This would include spark plugs, studs, valves, springs, spring caps, keepers, protection shims, rocker arm assemblies, camshafts and thrust plates for overhead camshaft units. In a word, everything is removed from the basic aluminum casting except for the valve guides and valve seats which are the subject of the next two steps.

At step 2 the valve guides are inspected for wear. If no wear is evident, the valve guides may remain. Worn valve guides needing replacement should be removed by the following method. The cylinder head is heated to 275° F., after which the valve guide is driven out with a suitable punch which has been placed in an air hammer. An additional method of overcoming worn valve guides is to use an oversized stem valve (as discussed below in connection with step 21). With the use of an oversized valve stem, the valve guides remain in the unit unless they are broken or not acceptable.

At step 3 the valve seats are inspected. If a valve seat requires replacement because it is worn or located in the area of a crack, it should be removed by the following method. Employing an AC arc welding plant, referred to as stick welding, and using a steel welding rod, a bead of weld is placed around the internal circumference of the valve seat which is to be removed. After allowing thirty seconds to cool down, the valve seat, now being reduced in size, can easily be removed by prying the seat register. If the first bead is insufficient, a second pass may be required. Certain cylinder heads may require that the valve seat be replaced if the valve guides are replaced. Steps 2 and 3 must be completed before the heat treatment step 4.

Step 4, the heating step, serves the dual purpose of cleaning and stress relieving the bare cylinder head. The head is placed in an oven for four to five hours, depending on the magnitude of grease and carbon buildup, at a temperature of approximately 500° F. After five hours, the oven temperature is gradually reduced to ambient temperature over a twelve hour span. This process reduces stress and anneals the aluminum casting back to its original condition.

In step 5, after the heat treatment has been completed and the cylinder head has cooled down to ambient temperature, the unit is further cleaned by blasting, using conventional blasting apparatus, normally using glass beads and aluminum shot or a combination of both. Blasting is done internally, to the extent possible and practical in a blasting process, as well as externally until all ash and scale deposits are removed.

An important feature of the present method is the complete removal from the cylinder head of all contaminants prior to the reconstruction and/or rebuilding stages. Removal of such contaminants is particularly important prior to the welding step which occurs in the reconstruction stage or the impregnation step which occurs during the rebuilding stage (step 11 to 21 to be discussed below). The heat treating and blasting stages will remove a majority of such contaminants. In the past, however, others have attempted to effect additional cleaning of the cylinder head by the use of chemical cleaners. However, it has been found that such chemical cleaners would tend to be absorbed into the aluminum casting, causing contamination during the welding process. Such contaminants include aluminum oxides, glycol and methylene chloride, to name a few. Thus, it is one preferred feature of the present invention to clean in the manner described above so as to assure the removal of contaminants and avoid adding new contaminants during the cleaning process.

Step 6 is the pressure testing of the cleaned unit. Although described herein as "step 6" it will be understood that pressure testing can and will be performed as desired at many different times in the overall renewal process. Pressure testing is accomplished by introducing air into the water jacket at a relatively high pressure of over 100 psi, preferably approximately 125 psi. This relatively high pressure, the usefulness of which has not previously been recognized in this industry, is needed in order to reveal microporosity which would not become evident at lower pressures. With the water jacket thus pressurized, a suitable means is employed for wetting the cylinder head so as to observe air bubbles passing through the walls of the cylinder head. For example, a preferred method is simply to spray soapy water onto the surface of the cylinder head. This can be done all over, but especially in the areas where cracks are most likely to occur. Additionally, if desired, the cylinder head can of course be immersed in a tank of water, although this is somewhat cumbersome and not altogether necessary.

An important feature of the present invention is that it not only effects reconstruction of cracks, breakage and the like, but also repairs leakage resulting from excessive porosity in an otherwise ostensively solid portion of the cylinder head, such as the wall portion 48 in FIG. 3. The present pressure testing step is intended to identify such areas. Additionally, important portions of the rebuilding stage, primarily the cleaning and impregnating steps 19 and 20 are intended to repair these areas of porosity. In this sense, the overall renewal process of the present invention is intended to correct all possible areas of fluid leakage, whether from cracks, breakages or simply excess porosity.

If the pressure tests conducted under step 6 show no cracks or other breakage, then the head is immediately rebuildable, i.e., there is no need for reconstruction. In this case the process moves directly to step 11, discussed below.

If on other hand the testing conducted in step 6 shows that the head has cracks or other breakage, that head is qualified as in need of reconstruction, whereupon it passes through the following steps 7 through 10.

In step 7 each of the cracked or broken areas in need of repair are prepared for welding. Preferably using a tungsten carbide grinding burr which is suitable for aluminum and a high speed die grinder, all material in the area of the crack is removed to a width of three-eighths of an inch and all the way through to the interior of the water jacket. Referring for example to FIGS. 2 and 3, step 7 would be performed on cracks 45 in the vicinity of the domes 40, 46 in the area of exhaust port 35 and 47 in the area of the superstructure. This latter crack could include for example a crack through a rocker arm mounting or a crack on the exterior of the valve port. It is an important feature of the present invention that in this step the material is completely removed, through to the interior of the water jacket. This is in contrast with prior welding preparation procedures, as shown for example in the Altgelt U.S. Pat. No. 3,192,618, wherein a given crack is cleaned out only in the form of a V-shaped channel, i.e., not all the way through the material which contains the groove. The importance of removing material beyond the extremities of the crack and to the sides of the crack is to assure full removal of contaminated material abounding the crack. As mentioned above, it is most important to remove contaminated material in the course of the present renewal process. The most important reason for removing contamination is to provide an uncontaminated field for the welding process. Referring to the figures, FIG. 4A illustrates a crack 45 and FIG. 4B illustrates this same area, 45a after the material in the vicinity of the crack has been removed.

It has further been discovered that welding is improved by treating the newly ground surfaces with a mild solution of an acid, preferably phosphoric acid. This can be done by dipping the unit or by brushing the acid on the surfaces. The cylinder head is then rinsed with clean water. This process assures ultracleanliness prior to welding.

Step 8 is the welding step, whereby any openings in the cylinder head created in step 7 are filled in. This is accomplished by a tungsten inert gas welding plant equipped with high frequency. The gas to be used is preferably pure argon. The welding plant must contain an adjustable voltage mechanism, most commonly provided via a foot pedal. The voltage range requirements would be up to 230 volts AC. A high frequency setting should be continuous with a soft start. The electrodes to be used should be a two percent thorated tungsten. The shape of the ceramic cup on the welding torch should be selected to give the maximum gas coverage possible without hindering the welding process.

Tungsten inert gas welding has been known heretofore, as described for example in the two articles cited above, "Welding Techniques, Part II" and "Welding Aluminum Cylinder Heads, How To Do The Impossible". As discussed in those articles, high frequency allows the welding procedure to continue without having to touch the welding torch to the surface of the cylinder head. The ceramic cup and the inert gas serve to form an inert atmosphere in the vicinity of the weld, thus minimizing or eliminating oxidation.

In the welding process, an AC power source should be used having a square wave adjustment. The setting should preferably be 45% straight polarity and 55% reverse polarity. This creates the maximum cleaning action. The reverse polarity chips aluminum oxide particles away from the aluminum surface. The high frequency should be set at maximum and on a continuous mode and a soft start. The aluminum cylinder head should be treated to temperature of 275° to 300° F. for thirty minutes prior to starting the welding process. All new surface areas should be exposed to the arc, allowing the surface material to melt and fuse. This creates a clean aluminum foundation for the filler rod. The welding puddle should be started at the beginning of the cavity. If the crack is not totally eliminated, a dark line will appear. This dark line should not show. Welding electrodes must remain approximately one-eighth inch away from the work at all times during the welding process. Voltage should be raised until the material forms a molten puddle. An appropriate filler rod should be attached to the weld puddle. The correct rod varies with the casting to be repaired. The rod should be as close in composition to the material as possible.

The above procedure should be followed until the entire cavity has been filled and all metals are fused and fluxed together. The welded material should extend approximately one-eighth inch above the surface of the unit. For example in FIG. 4C the area of the weld above the surface 39 would be approximately one-eighth inch. This has the advantage that impurities rise during welding and will hence be removed during subsequent contouring back to original dimensions.

If the opposite side of the weld area is reachable, in accordance with a new feature of the present invention, a bracket should be placed in the cavity on the opposite side of the weld. Preferably this bracket would be a one-fourth inch copper or bronze sheet placed directly under the welding area. This provides backup for the inert gas and concurrently eliminates oxygen from racing from below toward the newly placed hot metals, thus eliminating aluminum oxide formation. This also provides a good coverage of the inert gas on the top side of the weld.

The cylinder head should subsequently be placed in a heavily insulated container and allowed to cool down over a period of twelve hours, but preferably twenty-four hours, to ambient temperature. A slow cool down is preferable to avoid thermal shocks or the introduction of other stresses as the cylinder head cools down.

After step 8, the opening 45a is now filled with the bead of welded material 45b as shown in FIG. 4C. These beads are also visible in the figures of the article entitled "Welding Aluminum Cylinder Heads, How To Do The Impossible".

At step 9, the welded beaded areas are recontoured to establish the original shape of the cylinder head at those specific locations as shown for example at 45c in FIG. 4D. The removal of excess welding material is done with form cutters or hand operated die grinders using carbide bits of varying shapes and sizes. Incorporating a mixture of 50% oil plus 50% kerosene as a cutting medium prevents loading and galling resulting in acceptable surface textures. Recontouring to original shapes is necessary to create original operating efficiencies, for example in the area of the domes which form a part of the combustion chambers and in the original port areas. Conversely, poor contouring will result in a cylinder head with poor performance and poor service life.

After recontouring, the cylinder head preferably is tested again, at stage 10, which testing is conducted in essentially the same manner as described above with respect to step 6. If reconstruction has been completed successively, no air leaks of the pressurized air should exist at any of the crack areas 45, 46 or 47 or at any other location. An exception to this is that if leakage did occur because of excessive porosity, as illustrated at 48, such leakage will still occur since excess porosity is corrected subsequently at step 20.

If reconstruction has been completed successively, the reconstruction stage is now completed and the cylinder head moves back into the rebuilding stage at the point where it was removed after step 6, whereat it then proceeds through steps 11 through 16.

It is to be understood that machining steps 9 through 18 can be performed in any convenient sequence, i.e., not necessarily in the order as described herein.

At step 11, the valve guides are installed. The cylinder head is heated to a temperature of 275° F. and replacement valve guides are pressed in after shrinking by chilling the valve guide in dry ice or liquid nitrogen. The cylinder head is allowed to cool to ambient. The guides may now be machined to their original specifications by reaming or diamond honing. Diamond honing offers a superior finish and an improved size maintenance. If the original guides are still in use and within the tolerances, no machining is necessary at this time. If oversized valve stems are to be installed, proper machining thereof is necessary at this time.

At step 12 the valve seat recesses are machined to accommodate oversized valve seats. This is accomplished by using a vertical milling cutter to form the desired interference fit. Important to this step is the use of synthetic cutting fluids which prevent galling and maintain accuracy of size and surface finish.

The assembly steps 11 and 12 may result in uncovering faults within the newly welded areas. Thus, at step 13 it may be desirable to once again pressure test the entire cylinder head, following the procedure described previously with respect to step 6. If such cracks do occur, it is necessary to apply reconstruction steps 7 through 9 and a further testing step to these cracked welded areas.

At step 14 the valve seats are fitted. The head should be heated to a temperature between 250° to 275° F. and the valve seats chilled in dry ice or liquid nitrogen to shrink the valve seat. The cylinder head expands when heated and the seat contracts with heavy cooling. This eliminates the majority of the interference fit, reducing the amount of pressure to be exerted on the valve seat during installation. This in turn reduces the possibility of broaching which produces a reduction of the interference fit and poor surface contact. When installing, it is necessary to deburr the starting face which eliminates the possibility of broaching. The newly machined surface, where the seat is to be pushed, should be lubricated.

Since installation of the valve seats may cause welding imperfections to surface, pressure testing may be desirable once again at step 15 in order to identify any such faults. If such faults are found, they must be corrected by reconstruction steps 7 through 9 which must then be followed by another pressure testing step.

At step 16, the installed valve seats should be cut with three angles for maximum valve seat efficiency. These angles are 30° top relief, 44.5° valve seat angle and 60° thrust angle.

A well known problem in the renewal process is that through usage the aluminum cylinder head will tend to warp. This warpage will generally take the shape of an upward longitudinal bow, as represented schematically and of course somewhat exaggerated by the upward curved line 50 which would represent the warped position of the straight line just beneath it. Such warpage occurs because the aluminum cylinder head expands and contracts at a greater rate than the cast iron cylinder block 31 on which it is mounted. Although the aluminum cylinder head will tend to expand in all directions, various physical constraints in the cylinder head will tend to permit expansion in an upward direction more so than in other directions. Hence, in time, a permanent upward bow along a path represented by the curved line 50 results.

In the field of renewing aluminum cylinder heads, it has been thought necessary heretofore to straighten the head by reversing this warpage. Such procedures are discussed in several articles including for example the two articles cited above entitled "Saving Aluminum Heads" and "Straight Heads—Magic Is Not Needed". These known procedures for straightening warp may be metallurgically sound but they are extremely time consuming and difficult to perform correctly. It is rarely possible to straighten the head to within 0.002 inches. The clearance between the camshaft and the bearing journal is usually 0.002 to 0.003 inches. In this case a restriction would be felt between the camshaft and the journals after installation of the camshaft. Some have overcome this problem by honing the journals until the camshaft would run free. This creates two additional problems, namely excess bearing clearance which results in low oil pressure and continuing misalignment of the bearing journals. This would in turn cause the camshaft to flex during operation, resulting in poor performance and short product use.

The present invention has discovered a different procedure for correcting warpage. The present invention recognizes that the effects of such warpage are felt essentially in two places, namely the camshaft opening 36 and the bottom, or gasket face, 39. The present invention further recognizes that prior attempts to reverse the warpage through heat treatment techniques have the disadvantage of possibly creating new stresses in the cylinder head. Thus, the approach of the present invention is to attack the effected areas directly without using heat treatment techniques to reverse the warpage. This is accomplished in the following steps 17 and 18.

Step 17 concerns line boring. The axis of the camshaft opening 36 would also be warped, essentially parallel to the curve of line 50. At this time this shaft 36 is bored to a larger diameter which would encompass the vertically uppermost and vertically lowermost portions of this camshaft opening, thereby resulting in a straight but larger camshaft opening. After such line boring, an oversized camshaft which matches the size of the enlarged opening 36 would be used. Within this camshaft opening 36, the areas where the supports are attached should be machined with the cylinder head in an unstressed condition to assure true camshaft alignment. An alternative is to use a standard size camshaft when inserting cam bearings. The camshaft opening is line-bored, after which cam bearings are inserted by pressing them into place. The camshaft bearings are line-bored, after which a standard camshaft is inserted.

In step 18 the second problem of warpage is reversed. The gasket face 39 should of course match the flat upper surface of the engine block 31. To accomplish this the cylinder head is placed on a fixture and a milling machine, preferably with faceted cutters are used to mill this surface to a flat state. Preferably the surface should be not only flat, but also smooth so as to allow the aluminum cylinder head to pass slightly over the gasket as it expands and contracts at a greater rate than the cast iron block. A feature of the invention is to machine the gasket face surface smoother than industry practice. In accordance with the invention, it is machined to 40–100 R.M.S. In contrast, the industry practice is to machine the gasket face with a rougher finish outside these guidelines. If a relatively large amount of material must be removed to flatten the surface 39, this will slightly reduce the size of the combustion chambers in the finished engine, increasing compression ratios, possibly too high for the octane rating of the gasoline recommended for that vehicle. This problem is resolved by using steel shims with special high temperature silicone coatings placed between the cylinder block 31 and the head gasket.

Next, at step 19, after machining and before impregnation step 20, the cylinder head must be thoroughly cleaned, preferably using a mild alkaline cleaning agent to remove oil and soils from the castings.

A most significant characteristic of a cast aluminum cylinder head is that it is an inherently porous material. The porosity within a casting is so significant that it can provide potential paths through which liquids may seep. FIG. 3 illustrates a possible area 48 which is not a crack or any other deformation caused during operation, but is simply an area of porosity from which coolant would "seep" or "ooze". Such porosity is dealt with during the original manufacture of the cylinder head by impregnating the same with an anaerobic sealant.

However, normal use of the automobile and several steps of any approach to cylinder head renewal will remove the sealants applied by the manufacturer. For example, in use an engine may become overheated in service, and such overheating drives the sealants from the casting. In addition, the sealants become displaced during any renewing procedure, for example they are partially or totally removed by heavy alkaline cleaning, by the use of chemical cleaners such as carbosol, heat cleaning, dry blasting, welding, machining and straightening.

Heretofore, cylinder head manufacturers have attempted to solve the porosity problem by applying other sealants such as ceramic sealants to the surface of the cylinder head, driving the sealants into the pores under pressure. However, these prior techniques are inadequate because the ceramic sealants do not possess the ability to expand and contract at the same rate as the aluminum. Also, after these sealants are applied to the casting, air trapped in the pockets of porosity blow the sealant out upon subsequent heat expansion.

The problem of actually solving the porosity problem is so great that others dealing with aluminum cylinder heads have considered porosity to be an unsolvable problem such that a cylinder head having this problem is unrepairable. This is stated for example in the above noted Altgelt U.S. Pat. No. 3,192,618.

Although the renewal process described in this application is intended especially for aluminum cylinder heads, the vacuum impregnation step described below would be applicable to any cast engine part, for example a cast iron cylinder head, a cast iron engine block, or the like.

At step 20 of the renewal process, the cylinder head is vacuum impregnated to eliminate the problems of porosity. According to the preferred method, the parts to be treated, including the aluminum cylinder head or any other part is submerged in a bath of resin, preferably methacrylate monomers, or other suitable polymer or crystaline style resins which fill an autoclave. The autoclave is then sealed and evacuated in order to remove air from the porosity of the casting. After approximately ten minutes, the vacuum is released, allowing natural air pressure to squeeze the resin into the pores of the casting. The parts are then removed and placed in a rinse tank which removes the film of sealant left on the parts. Surface tension causes the resin within the pores to remain in place. After removing the cast parts from the rinse tank they are placed in a hot water cure tank heated to approximately 85° to 90° F. for about ten minutes. Time in the cure tank depends on the heat transferring abilities of the material being treated. This allows full polymerization of the resin. The porosity is now sealed with a temperature resistance in excess of 400° F.

A special problem arises with respect to a crack in the oil gallery which conveys oil through a portion of the superstructure 34 to a valve port. As shown in FIG. 5A, the normal practice is to weld the visible crack 56, ignoring the lower crack 57 which is inaccessible and hence cannot be welded. Nonetheless, oil still leaks through this lower crack 57, leaking oil into the coolant and under the valve cover. It remains desirable to eliminate this problem. A weld covering an upper crack 56 is visible in the above article "Escort Heads—Making Repairs" in the middle of FIG. 1. Not only does this weld over crack 56 not solve the problem, but it aggravates it since the strain from the weld would tend to further open the lower crack 57.

According to the present invention, this problem is solved not by the usual welding technique, but instead by inserting a tube 58 into the passage of the oil gallery. As shown in FIG. 5C, this is preferably a tube having an interference fit with the passageway through the gallery and having a threaded exterior, the tube being threaded down into the passageway spanning and essentially sealing the crack all around the passageway including the upper portion 56 and the lower portion 57.

Although the invention has been described in considerable detail with respect to preferred embodiments, it will be apparent that the invention is capable of numerous modifications and variations, apparent to those skilled in the art without departing from the spirit and scope of the invention.

We claim:

1. A method for renewing a used cast aluminum water coolant cylinder head to a condition suitable for reuse, comprising the steps of:

stripping substantially all removable component parts from the cylinder head, cleaning the cylinder head, heating the cylinder head to relieve stresses, repairing cracks in the cylinder head by removing the material of the cylinder head in the vicinity of the cracks and, using a welding process, adding back new material to replace the removed material, compensating for warpage of the cylinder head, impregnating the cylinder head to prevent liquids from leaking through excess porosity thereof, said impregnating step including subjecting the cylinder head to a vacuum to remove air from the pores of the cylinder head, followed by releasing the vacuum, while the cylinder head is covered by the impregnating liquid, to cause the pressure of the air following release of the vacuum to force the resin into the porosity of the cylinder head and replacing the component parts of the cylinder head which correspond to those parts which were removed, thereby rendering the cylinder head operable for use with a cylinder block.

2. The method of claim 1, wherein the heating step comprises heating the cylinder head in an oven for approximately four to five hours at a temperature of approximately 500° F., and then gradually reducing the temperature of the oven to ambient temperature, whereby stresses in the cylinder head are relieved and the cylinder head is annealed back to its original condition and the cylinder head is cleaned in the absence of potentially contaminating chemicals.

3. The method of claim 1, wherein repairing the cracks comprises machining out a space in the vicinity of detected cracks, which space extends to both sides of the crack and beyond its ends, and completely through the layer of material of the crack, thereby removing contaminated areas adjacent the crack, filling the space which was machined out using inert gas welding, and at least partially contouring the filled in weld material to the original shape of the cylinder head in that vicinity.

4. The method of claim 1, wherein the step of compensating for warpage includes line-boring out the camshaft opening of the cylinder head to a larger dimension such that the camshaft support surfaces within the opening are enlarged, cylindrical and coaxial, and adapted to receive an oversized camshaft, and machining the lower gasket face of the cylinder head to be substantially flat to thereby mate with the top of the cylinder block.

5. The method of claim 1, wherein the impregnation step includes submerging the cylinder head within a bath of resin within a container, sealing the container and attaching it to a vacuum to evacuate substantially all air from the container, thereby also removing air from the porosity of the casting, releasing the vacuum to allow the ambient air to force the resin into the porosity of the cylinder head and curing the resin within the pores.

6. The method of claim 1, wherein after the heating step the cylinder head is tested for cracks, said testing comprising filling the enclosed coolant water space of the cylinder head with a fluid at a pressure of greater than 100 psi, and applying a liquid to the external surface of the cylinder head, and observing any leakage of the pressurized fluid from within the coolant water space to the exterior of the cylinder head.

7. The method of claim 1, wherein the resin is a methacrylate monomer, or other suitable polymer or crystaline resins.

8. The method of claim 1, wherein after release of the vacuum the cast engine part is rinsed off.

9. A method according to claim 1, wherein the step of cleaning the cylinder head is performed by heating the cylinder head.

10. A renewed used cast aluminum water cooled cylinder head formed by the process of claim 1.

* * * * *